United States Patent
Blumenau (12)

(10) Patent No.: US 6,505,240 B1
(45) Date of Patent: Jan. 7, 2003

(54) AMELIORATING BANDWIDTH REQUIREMENTS FOR THE SIMULTANEOUS PROVISION OF MULTIPLE SETS OF CONTENT OVER A NETWORK

(76) Inventor: Trevor I. Blumenau, 1907 Redwood Ave., Redwood City, CA (US) 94061

( * ) Notice: Subject to any disclaimer, the term of this patent is extended or adjusted under 35 U.S.C. 154(b) by 0 days.

(21) Appl. No.: 09/144,369

(22) Filed: Aug. 31, 1998

(51) Int. Cl.⁷ .............................................. G06F 15/16
(52) U.S. Cl. ........................ 709/218; 709/201; 709/202; 709/203; 709/218; 709/219; 709/231; 709/232; 725/36; 725/42; 725/44
(58) Field of Search ................................. 709/201, 202, 709/203, 231, 232; 348/6, 9, 7, 12, 13, 218–219, 722; 455/4.1, 4.2, 5.1; 725/36, 42, 44

(56) References Cited

U.S. PATENT DOCUMENTS 5,778,187 A  *  7/1998  Monteriro .................... 709/31
5,892,535 A  *  4/1999  Allen et al. .................... 348/9
6,075,551 A  *  6/2000  Berezowski et al. ........... 348/9

* cited by examiner

Primary Examiner—Dung C. Dinh
Assistant Examiner—Hieu Le
(74) Attorney, Agent, or Firm—David R. Graham

(57) ABSTRACT

A "primary" content providing site effects the simultaneous provision of different sets of content to one or more content display sites by transmitting "handoff" instructions that cause one or more "proxy" content providing sites to provide content to the content display site(s). (Content may or may not be provided directly from the primary content providing site.) Since content is provided from more than one content providing site, the invention enables a primary content providing site to effect the simultaneous provision of different sets of content in a manner that ameliorates the bandwidth limitations associated with a conventional content distribution scheme in which all of the sets of content are provided from a single content providing site.

30 Claims, 3 Drawing Sheets

AMELIORATING BANDWIDTH REQUIREMENTS FOR THE SIMULTANEOUS PROVISION OF MULTIPLE SETS OF CONTENT OVER A NETWORK

BACKGROUND OF THE INVENTION

1. Field of the Invention

This invention relates to the provision of content (and, in particular, data intensive content such as video content) over a network. In particular, the invention relates to the simultaneous provision of different sets of content from a content provider and, even more particularly, to the simultaneous provision of different sets of content that are tailored to the characteristics of anticipated observers of the content.

2. Related Art

Digital computer networks have become a significant medium for communicating content. However, the physical apparatus ("hardware") currently used to implement digital computers and the interconnections between digital computers in a network have limited bandwidth (i.e., capacity to transmit data per unit time). Bandwidth limitations restrict the amount and/or type of content that a content provider can provide at any one time.

In general, content communicated over a digital computer network can be text, video, audio or some combination of the three. Of those three types of content, the representation of video content (as used herein, a sequence of visual images over time) by a digital computer requires the most amount of data by far. The data intensive nature of video content has limited the ability to transmit video content over a digital computer network. In particular, the ability to broadcast video content over a digital computer network is currently rudimentary at best. The ability to provide video-on-demand over a digital computer network is even more limited.

For content providers, it can be desirable to provide content so that content ("secondary content") is provided in addition to the content ("primary content") that is intended to be the primary focus of the content being provided. For example, it can be desirable to insert advertisements (secondary content) into a broadcast of an entertainment program, such as a sports event or movie (primary content). It can further be desirable to tailor the secondary content so that different secondary content is provided to different observers. In particular, it can be desirable to tailor secondary content in accordance with one or more characteristics of anticipated observers of the secondary content. For example, different advertisements may be provided to different observers based upon characteristics of the observers such as, for example, age, sex or occupation.

The provision of secondary content during breaks in the provision of primary content, where the secondary content is not tailored as described above (i.e., so that only a single set of secondary content is provided by the content provider), generally does not exacerbate network bandwidth limitations. However, providing secondary content at the same time as the primary content is provided does exacerbate network bandwidth limitations, since the required data transmission capacity is increased. Network bandwidth limitations are also exacerbated when, during breaks in the provision of primary content, multiple sets of secondary content are provided at the same time (as may be necessitated if tailored secondary content is being provided), since the required bandwidth is multiplied by the number of sets of secondary content being provided. Particularly if it is desired to simultaneously provide many sets of secondary content (whether at the same time as the provision of primary content or during breaks in the provision of primary content), as would be necessary to enable provision of highly tailored secondary content, network bandwidth limitations can present an insurmountable—or, at least, an expensive—obstacle to overcome. This is especially so when the content includes video content: currently, it is not feasible to provide video content in which primary content is supplemented with secondary content tailored to any appreciable degree. Further, even as improvements in data transmission infrastructure (hardware and software) increase available bandwidth, the ability to provide tailored content will be limited as compared to the ability to provide content without such tailoring.

In addition to situations in which primary content is augmented by providing secondary content, there are other situations in which it is desirable for a content provider to simultaneously provide different sets of content to different observers. A content provider may desire to provide multiple sets of primary content at the same time. A content-on-demand system would require such capability. It may also be desirable for a broadcast system to have such capability as well. As above, such capability would be advantageous to enable a content provider to tailor the content being provided in accordance with the characteristics of anticipated observers of the content. As discussed above, current data transmission infrastructure does not make systems including such capability feasible.

SUMMARY OF THE INVENTION

According to the invention, a "primary" content providing site effects the simultaneous provision of different sets of content to one or more content display sites by transmitting "handoff" instructions that cause one or more "proxy" content providing sites to provide content to the content display site(s). (Content may or may not be provided directly from the primary content providing site.) Since content is provided from more than one content providing site, and since the handoff instructions require the transmission of far less data than required for the data representing the content being provided, the invention enables a primary content providing site to effect the simultaneous provision of different sets of content in a manner that ameliorates the bandwidth limitations associated with a conventional content distribution scheme in which all of the sets of content are provided from a single content providing site.

Since the amount of data required to represent video content is very large compared to the amount of data required to represent audio or text content, a particular advantage of the invention is that a content provider can simultaneously provide different video content to viewers at different content display sites without degradation of the quality of the video display presented at each content display site. Further, since content is provided from multiple sites, a large number of different sets of content can be provided simultaneously, thus enabling a content provider wide latitude to tailor the content provided to each content display site (i.e., many different sets of content can be provided) and, in particular, to tailor the content in accordance with the characteristics of the anticipated observers at a content display site.

The invention can be used in a variety of ways. For example, the invention can be used to simultaneously provide different sets of secondary content (e.g., different advertisements) to different content observers during breaks in the provision of a set of primary content (e.g., an entertainment program such as a sports event or movie). The invention can also be used to provide secondary content at the same time as primary content is provided (to enable, for example, display of the secondary content at the same time as the primary content). The invention can also be used to simultaneously provide different sets of primary content. The invention can be used with both broadcast and content-on-demand content distribution systems.

Generally, the invention can be used to facilitate the distribution of content from content providers to content observers via any type of network. More particularly, the invention can be advantageously used to distribute content via a digital computer network, such as the Internet (and, even more particularly, via the World Wide Web). The invention can also be used to distribute content via a cable television network.

In one embodiment of the invention, content is provided to a content display site by: i) providing primary content from a primary content providing site to the content display site; ii) transmitting a set of one or more instructions (handoff instructions) from the primary content providing site; and iii) providing secondary content (that is different from the primary content) from a proxy content providing site (that is different from the primary content providing site) to the content display site in accordance with the set of instructions.

In another embodiment of the invention, different sets of content are simultaneously provided to a plurality of content display sites by: i) determining, for each content display site, the content providing site from which a set of content will be transmitted to the content display site; and ii) transmitting one or more sets of one or more instructions from a primary content providing site, each set of instructions causing a proxy content providing site to provide a set of content to one or more content display sites in accordance with the set of instructions, wherein the different sets of content are provided from at least two different content providing sites.

The determination of which of multiple sets of content are to be provided to each of the content display sites can be made in any appropriate manner. As indicated above, the determination can depend upon characteristics of the anticipated observers at a content display site, such as age, sex or occupation. The determination can also depend upon other factors, such as the topographical proximity of particular content providing sites to the content display site.

The determination of which content providing site to provide a set of content from (when more than one content providing site can provide that set of content) can also be made in any appropriate manner. For example, the determination can be made based on a topographical analysis of the relevant network sites. The topographical analysis may determine, for example, the topographical proximity of a content display site to several content providing sites, a content providing site being favored in accordance with its topographical proximity.

DETAILED DESCRIPTION OF THE INVENTION

The invention enables a content providing site to effect the simultaneous provision of different sets of content via a network in a manner that ameliorates the bandwidth limitations associated with a conventional content distribution scheme. Herein, a "primary content providing site" is a network site to which a content observer at a content display site directs a request for the provision of content. In response to a request for the provision of content, the primary content providing site transmits handoff instructions (discussed further below) that cause one or more proxy content providing sites to provide content to one or more content display site(s). (The handoff instructions require negligible bandwidth compared to the data representing the content being provided.) Herein, a "proxy content providing site" is a network site which provides content to a content display site as a result of instructions from a primary content providing site. The primary content providing site may or may not itself provide content to the content display site. However, at least two content providing sites provide content to content display site(s). The provision of content from more than one content providing site reduces the bandwidth requirements for any one content providing site, unlike a conventional content distribution scheme in which all of the sets of content are provided from a single content providing site. In general, the invention can be used to facilitate the distribution of content from content providers to content observers via any type of network (e.g., a digital computer network, such as the Internet, or a cable television network).

Figure 1:
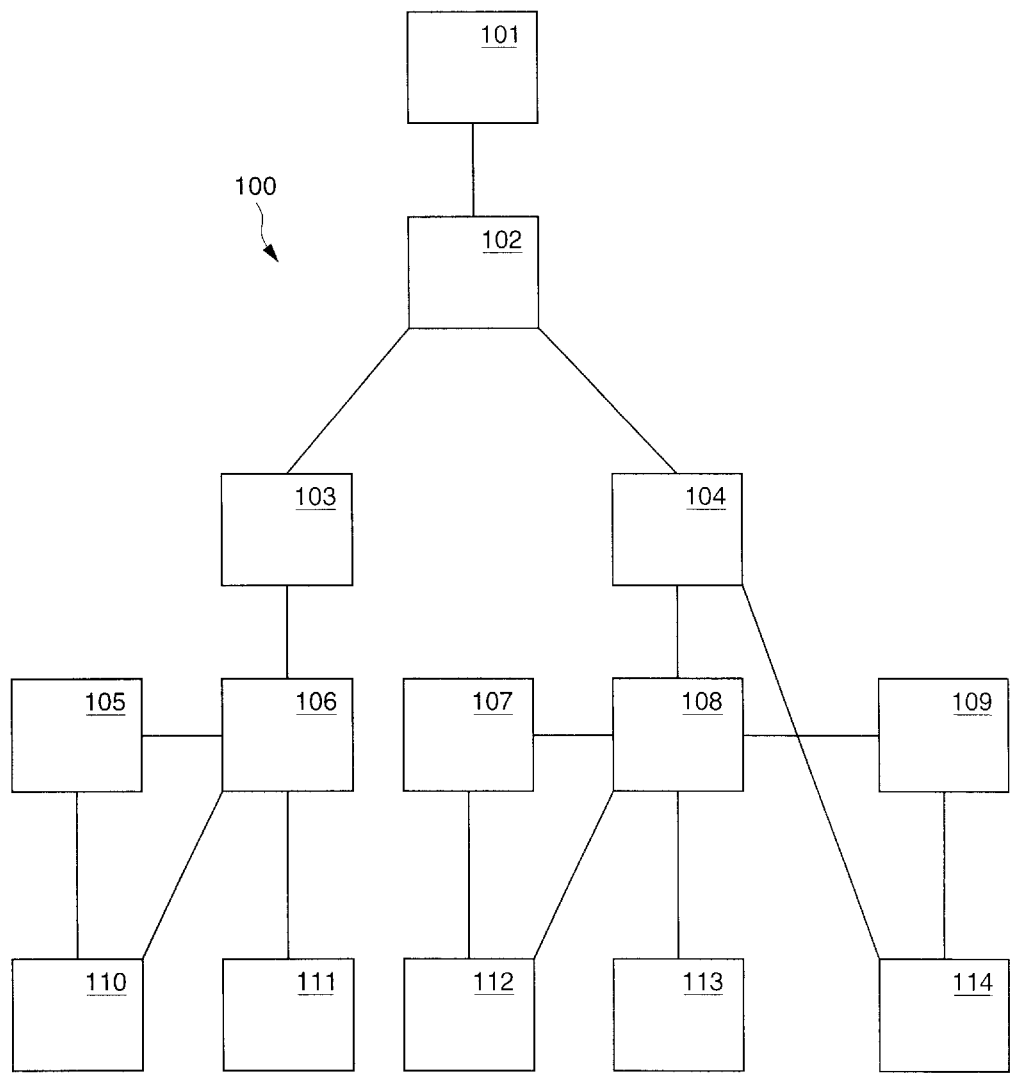
FIG. 1 is a simplified diagram of a network.

FIG. 1 is a simplified diagram of a network 100 including network sites 101–114. (Each of the network sites 101–114 can be embodied by, for example, one or more digital computers.) The network site 101 (content providing site) stores data representing content (such data is sometimes referred to herein as "content data" to distinguish it from other types of "data," such as the data used to represent instructions, e.g., handoff instructions, being transmitted from one network site to another) to be provided to other of the network sites 102–114. To facilitate description of the invention, it will be assumed that the content providing site 101 is providing content that will be received and observed by the network sites 110–114 (content display sites).

Figure 2:
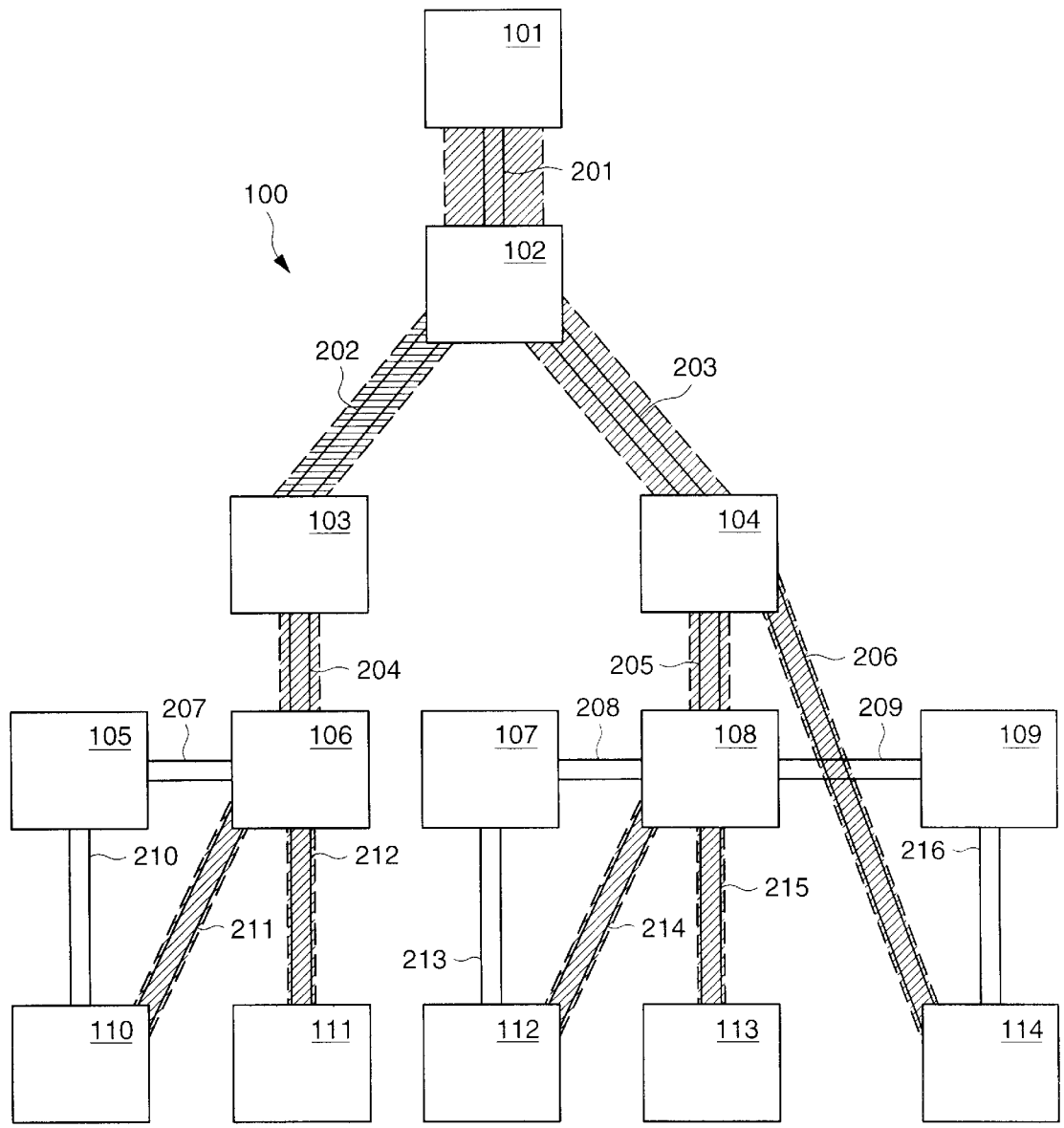
FIG. 2 is a diagram of the network of FIG. 1, illustrating the simultaneous distribution of different sets of content from a content providing site to each of multiple content display sites.

FIG. 2 is a diagram of the network 100 of FIG. 1, illustrating the simultaneous distribution of different sets of content from the content providing site 101 to each of the five content display sites 110 through 114. In FIG. 2, each transmission line (transmission lines 201–216) between network sites is represented by a channel defined by solid lines extending between the network sites. The width of the channel represents the bandwidth of the transmission line. To make illustration of the invention simpler, it will be assumed that the bandwidth is the same for each transmission line. The amount of bandwidth "required" by each transmission line is represented by a channel defined by dashed lines extending between a pair of network sites and marked by sectional lines. The "required" bandwidth of a transmission line is the minimum bandwidth needed to ensure that the data for all sets of content that are to be transmitted over that transmission line is transmitted quickly enough to enable generation of a display at each content display site of a predefined acceptable quality. To make illustration of the invention simpler, it will be assumed that the required bandwidth for each set of content is the same and is equal to the bandwidth of the transmission lines.

To further facilitate description of the invention, it will further be assumed that the data representing the content stored by the content providing site 101 is distributed over the network 100 as follows. Content data is transmitted from the content providing site 101 to the content display site 110 by being transmitted sequentially from the content providing site 101 to the network site 102, from the network site 102 to the network site 103, from the network site 103 to the network site 106, and finally from the network site 106 to the network site 110. Similarly, content data is transmitted from the content providing site 101 to the content display site 111 via, in sequence, the network sites 102, 103 and 106; from the content providing site 101 to the content display sites 112 and 113 via, in sequence, the network sites 102, 104 and 108; and from the content providing site 101 to the content display site 114 via, in sequence, the network sites 102 and 104.

As can be seen, some of the transmission lines do not have the required bandwidth necessary to enable content to be adequately transmitted from the content providing site 101 to the content display sites 110–114. Consequently, it is either not possible to produce a display at the content display sites 110–114, or the display produced is of unacceptably low quality (e.g., when the content includes video content, the effective frame rate is low enough to produce artifacts in the display such as jerky images). For example, the transmission line 201 between the content providing site 101 and the network site 102 is inadequate to the task of simultaneously transmitting the five different sets of content data that are to be provided to the content display sites 110 through 114, the transmission line 201 enabling content data to be transmitted at only one fifth the necessary rate. Though the magnitude of the bandwidth deficiency decreases as the sets of content data make their way through the network 100, the transmission lines between other pairs of network sites also do not have the required bandwidth. For example, the transmission lines 202, 204 and 205 enable content data to be transmitted at only one half the necessary rate, while the transmission line 203 enables content data to be transmitted at only one third the necessary rate.

It should be noted that the above description understates the bandwidth problem, since, as described, only the sets of content data being provided by the content providing site 101 are being transmitted over the network 100. In practice, other data (including data representing content being provided by other content providing sites) will typically also be transmitted at the same time over the various transmission lines, thus exacerbating the bandwidth deficiency of those transmission lines. In particular, the bandwidth of one or more transmission lines may be overtaxed to an even greater degree than that shown for the transmission line 201 in FIG. 2.

Additionally, the bandwidth limitations of the network 100 may be more severe than indicated by the illustration in FIG. 2 and the above discussion, since the characteristics of the devices (e.g., digital computer(s)) at the network sites 101–114 may also limit the rate at which data can be transmitted via the network 100. For example, though the illustration of the network 100 shows multiple transmission lines connected to some of the network sites 101–114, at the point of ingress and egress to a network site there may in fact be a single communications path. Thus, for example, the five sets of content data may all exit the network site 102 through the same communications path, though two are eventually transmitted via the transmission line 202, while the other three are transmitted via the transmission line 203. This can further reduce the speed with which content data is transmitted via the network 100.

Figure 3:
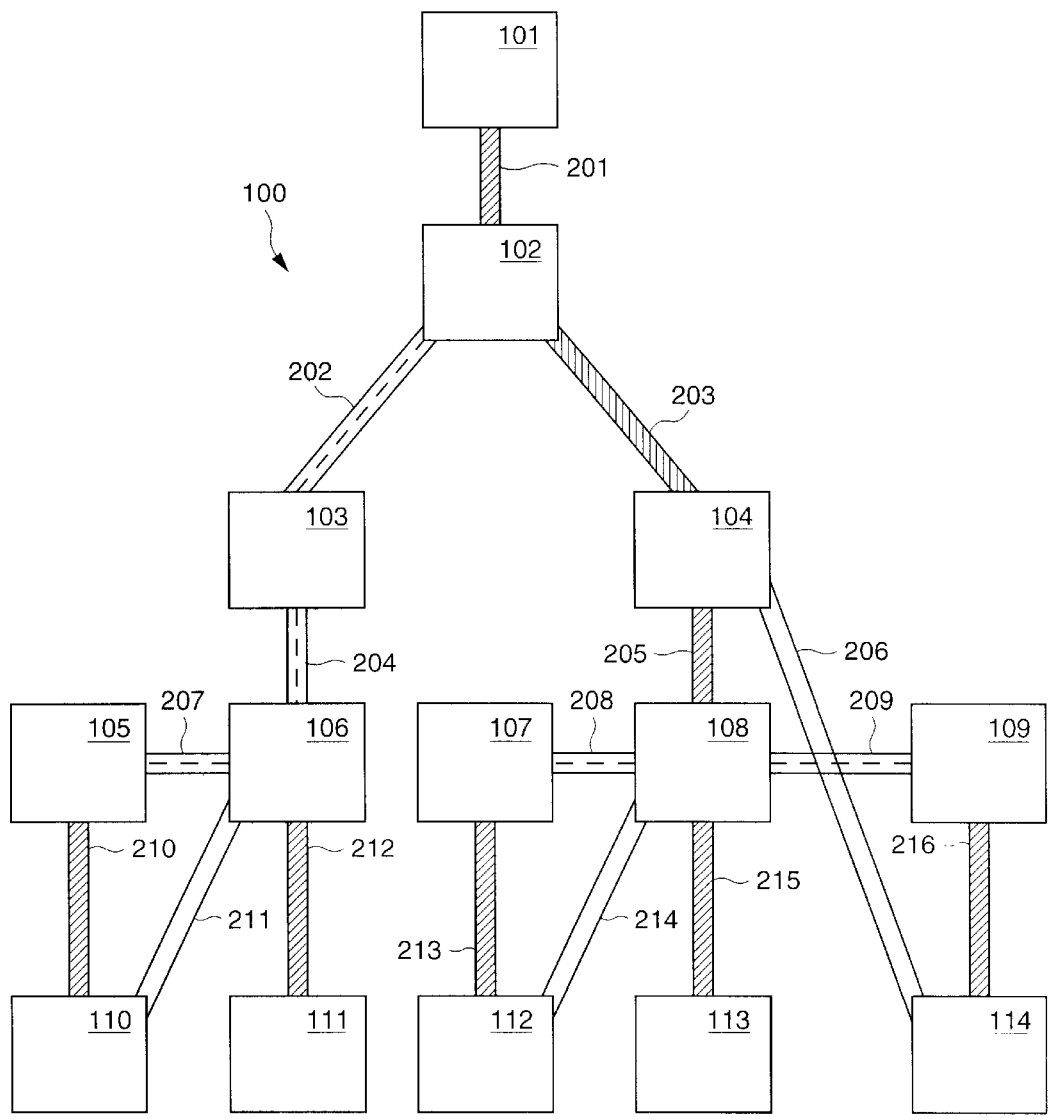
FIG. 3 is a diagram of the network of FIG. 1, illustrating the simultaneous distribution of different sets of content, in accordance with the invention, from a content providing site to each of multiple content display sites.

FIG. 3 is a diagram of the network 100 of FIG. 1, illustrating the simultaneous distribution-of different sets of content, in accordance with the invention, from the content providing site 101 to each of the content display sites 110–114. In accordance with the assumptions made above regarding the network 100, in order to ensure that each of the content display sites 110–114 is able to generate a display of acceptable quality, no more than one set of content data can be transmitted via any one of the transmission lines 201–216. (This need not necessarily be the case in actual implementations of the invention; in general, sets of content data are distributed among the content providing sites in any desired manner that does not overtax the available bandwidth from the content providing sites.) To facilitate description of the invention, it will be assumed that the set of content data to be transmitted to the content display site 113 is stored at, and transmitted from, the content providing site 101. The sets of content data to be transmitted to the content display sites 110, 111, 112 and 114 are stored at, and transmitted from, respectively, the network sites 105, 106, 107 and 109. The transmission of content data is indicated in FIG. 3 by sectional lines within a transmission line.

At an appropriate time, the content providing site 101 begins the transmission of content data to the content display site 113. The content providing site 101 also transmits handoff instructions that cause the sets of content data stored at the network sites 105, 106, 107 and 109 to be transmitted to the content display sites 110, 111, 112 and 114, respectively. Typically, such transmission of handoff instructions entails transmitting instruction(s) to each of the network sites 105, 106, 107 and 109 that indicate that the content data stored at that site is to be transmitted to the corresponding content display site 110, 111, 112 and 114. (The transmission of handoff instructions is indicated in FIG. 3 by dashed lines within a transmission line.) The handoff instruction(s) regarding the content to be transmitted to the content display site 110 are transmitted to the network site 105 via the network sites 102, 103 and 106. The handoff instruction(s) regarding the content to be transmitted to the content display site 111 are transmitted to the network site 106 via the network sites 102 and 103. The handoff instruction(s) regarding the content to be transmitted to the content display site 112 are transmitted to the network site 107 via the network sites 102, 104 and 108. The handoff instruction(s) regarding the content to be transmitted to the content display site 114 are transmitted to the network site 109 via the network sites 102, 104 and 108. The transmission of handoff instructions is indicated in FIG. 3 by a dashed line within a transmission line.

The handoff instructions required to cause the sets of content data stored at the network sites 105, 106, 107 and 109 to be transmitted to the content display sites 110, 111, 112 and 114 require negligible data transmission capacity as compared to the sets of content data themselves. Thus, the bandwidth limitations described above with respect to FIG. 2 are greatly reduced and may be eliminated completely. As can be seen, no transmission line in the network is required to transmit more content data than can be adequately accommodated by that transmission line.

Thus, the invention can effectively enable a content providing site to provide, at a given time, an amount of content that is greater than the amount that can be adequately transmitted from the content providing site by the data communications hardware and software at the content providing site and the data communications hardware connected to the content providing site. Rather than dividing up the existing data transmission capacity from a content providing site in order to simultaneously provide different content to one or more content display sites, the invention enables that data transmission capacity to effectively be augmented. Consequently, the invention enables a particular content providing site to simultaneously provide a greater number of different sets of content without loss of display quality or additional cost (for adding greater data transmission capacity from the content providing site), provide the same number of different sets of content at the same cost with an increase in the display quality, or provide the same number of different sets of content at reduced cost without loss of display quality. As can be appreciated, the advantages of the invention increase as the desired number of sets of content to be provided increase.

As discussed above, the representation of video content requires a relatively large amount of data. Thus, the transmission of video content from a content providing site requires a relatively large amount of bandwidth. A particular advantage of the invention is that a content provider can simultaneously provide different video content to viewers at different content display sites without degradation of the quality of the video display presented at each content display site.

As discussed in more detail below, the invention can enable simultaneous provision of different sets of content that are tailored specifically for different content display sites. The particular set of content provided to a content display site can be determined as a result of observer-specified preferences or as a result of determinations made by the content provider based on known observer and/or network characteristics.

One advantageous application of the invention is in situations in which a primary content provider providing primary content over a network desires to also provide secondary content together with the primary content. The primary and secondary content can be of any desired type. The primary content, for example, can be a movie, a sports event, a situation comedy, a news broadcast, a documentary, etc. The secondary content, for example, can be an advertisement, news headlines, a logo, a current time display, or content being provided by another content provider (including primary content being provided from another primary content provider).

The data representing the secondary content can be provided at the same time as the data representing the primary content so that the secondary content can be displayed together with the primary content at a content display site (typically in an unobtrusive fashion, such as, for video content, near an edge of the display of the primary content and/or as an overlaid image). Such simultaneous provision of secondary content and primary content can make advantageous use of the invention, eliminating the need for the primary content provider to provide both the primary and secondary content.

The data representing the secondary content can also be provided alone during breaks in the provision of the data representing the primary content so that the secondary content can be displayed during breaks in the display of the primary content. If multiple different sets of secondary content are to be provided simultaneously during such a break in the provision of the primary content, such provision of content can also make advantageous use of the invention, eliminating the need for the primary content provider to simultaneously provide multiple sets of secondary content. (Multiple sets of secondary content can also be provided when secondary content is being provided at the same time as primary content, as described above, further amplifying the benefit provided by the invention.)

As indicated above, the invention enables simultaneous provision of different sets of secondary content that are each tailored for the particular content display site or sites to which the set of secondary content is provided. (When the invention is used to provide a set of secondary content at the same time as the primary content, the secondary content can also be tailored for the particular content display site to which the content is being sent.) In particular, it can readily be appreciated that it would be desirable to provide secondary content that is tailored in some manner in accordance with characteristics of the anticipated observer(s) at particular content display sites. For example, as advertisers well know, it is very beneficial to be able to target advertisements to observers who possess characteristics that indicate a strong likelihood of interest in what is being advertised (e.g., it is preferable to display an advertisement for an automobile to observers who are of, or near, driving age). It can also be desirable to tailor secondary content in accordance with characteristics of the network over which content is being provided. For example, if the secondary content is a display of the current time, it can be desirable to simultaneously display different times to observers in accordance with the time zone in which each content display site is located. There are a multitude of additional situations in which it would be desirable to tailor content in accordance with the characteristics of the anticipated observer(s) and/or the network. Tailoring of content for a particular content display site is discussed further below.

The invention has been described above as used in situations in which a primary content provider providing primary content over a network desires to provide secondary content together with the primary content. However, the invention can be used in other situations in which it is desired to simultaneously provide different sets of content from a content providing site to content display sites.

For example, a content provider may schedule provision of a particular type of content (e.g., a movie) at a particular time. The content provider may further desire to provide different instantiations of that type of content (e.g., different movies) to different observers at that time. The invention can be used to effect such content provision, causing one or more of the instantiations (e.g., movies) to be provided from a proxy content providing site in response to handoff instructions from the primary content providing site, thereby tending to reduce the bandwidth demands placed on particular data communication channels of the network over which the content provision occurs.

In a similar manner, the invention can also be used to enable or facilitate the provision of "content-on-demand" over a network. Herein, "content-on-demand" refers to the capability of providing any of multiple sets of content to a requester at any time. It is particularly desirable—and difficult—to be able to provide video-on-demand over a network (and, in particular, a digital computer network); to date, the high bandwidth required by the large amount of data necessary to adequately represent video content has prevented such capability from existing in an acceptable way. Any of the embodiments of the invention described above (e.g., simultaneous provision of primary and secondary content, simultaneous provision of multiple sets of secondary content, simultaneous provision of multiple sets of primary content) could be used to enable or enhance a content-on-demand system. The use of one or more proxy content providing sites in conjunction with a primary content providing site as described above can enable the construction of a content-on-demand system providing acceptable display quality far in advance of the time when the evolution of data communications infrastructure (including hardware and software) provides the bandwidth to enable such a system to operate from a single content providing site. Moreover, even as the bandwidth characteristics of networks improve over time, the invention will enable the quality of content-on-demand systems (as well as broadcast systems) to be better than they otherwise would be.

According to the invention, a primary content providing site can simultaneously provide different sets of content to one or more content display sites by transmitting handoff instructions to other proxy content providing site(s) that then provide content to the content display site(s). There are three pieces of information that enable such simultaneous provision of content from different content providing sites to successfully occur: the time at which a set of content must be received by each content display site, the set of content to be provided to each content display site, and the identity of the content providing site that will provide the set of content to a particular content display site.

The handoff instructions include one or more instructions (sometimes referred to herein as "timing instructions") indicating the time by which a content display site must receive the set of content from the content providing site or the time by which the content providing system must begin providing the set of content. The handoff instructions may also include one or more instructions (sometimes referred to herein as "content identification instructions") identifying a set of content to be provided from a content providing site. The handoff instructions may also include one or more instructions (sometimes referred to herein as "proxy content providing site identification instructions") identifying the proxy content providing site from which a set of content is to be provided. However, the identification of the set of content and the proxy content providing site can also be performed at any other network site, as discussed further below.

The handoff instructions are transmitted in accordance with the communications protocol being used to transmit data over the network. In general, the handoff instructions can be transmitted before, during (e.g., between frames of video data) or after the transmission of content data from the content providing site. However, it is anticipated that in most applications the handoff instructions must be transmitted before or during the transmission of content data to ensure that content data is provided in a sufficiently timely manner from proxy content providing sites. It can also be possible to transmit the handoff instructions as part of the content data, e.g., a video data protocol may provide some unused data within the amount of data designated as a "video frame" that can be used to specify handoff instructions.

The timing instructions ensure that each content display site has obtained the data necessary to enable generation of a display of the appropriate set of content at the proper time. This is particularly important when the invention is used in a broadcast environment. It is even more important when secondary content is being provided for display with primary content. It is more important still when the secondary content is being displayed during breaks in the primary content, since it is necessary to maintain accurate synchronization of the display of primary and secondary content to provide a seamless display. The timing instructions can be provided directly to appropriate proxy content providing site(s) and/or directly to content display site(s). In the latter case, the content display site must, in turn, transmit appropriate instruction(s) to the proxy content providing site to cause the set of content to be transmitted from the proxy content providing site to the content display site. In each case, the timing instructions must be transmitted from the primary content providing site sufficiently prior to the time at which the display of the corresponding set of content is to begin to enable transmission of the instruction(s) to the proxy content providing site (if necessary) and to enable the set of content to be transmitted from the proxy content providing site to the content display site. The duration of this lead time can be established in view of the latency and bandwidth characteristics of the network, the content providing sites and the content display sites.

The content can be tailored in any appropriate manner. For example, any desired characteristics (e.g., age, sex, occupation) of the anticipated observers at a particular content display site can be used in determining the particular content to be provided to that content display site. Depending upon the availability of information (which may be provided directly by the observers), the characteristics used can be quite specific so that content can be very specifically tailored for each content display site. U.S. Pat. Nos. 5,515,098 and 5,661,516, issued to John B. Carles on May 7, 1996 and Aug. 26, 1997, respectively, which describe a method for using characteristics of anticipated observers to determine the content to be provided to those observers, provide an illustration of a method for tailoring content that can be used with the invention.

It is also possible to use other information to determine the content to be provided. For example, the topographical proximity (discussed further below) of particular content providing sites to a content display site can be used to influence the selection of content to be provided to the content display site. For instance, it may be desirable to favor the provision of sets of content that are available from content providing sites that are relatively more topographically proximate to a content display site, so as to ensure or increase the likelihood that a set of content will be timely provided to the content display site. In the same vein, it may be desirable to use methods, known to those skilled in the art, for discerning the bandwidth and latency characteristics of a particular connection to a network site, and influence the selection of a set of content (or content providing site) according to the bandwidth and latency characteristics of the network connections to candidate content providing sites. For example, a "ping" or similar type of analysis could be performed to measure the "hops" (i.e., intermediate network sites) and latency between a content display site and content providing sites.

The content providing site from which a set of content is to be transmitted can be identified in any appropriate manner. In some implementations of the invention it may be the case that each different set of content is provided by only a single content providing site. In that case, identification of the set of content to be provided to a content display site constitutes the identification of the content providing site that is to provide the set of content to the content display site, and vice versa.

However, the invention can be embodied so that a particular set of content is available from more than one content providing site (such sites are sometimes referred to herein as "redundant content providing sites"). In that case, typically, once it has been determined which set of content is to be provided to a content display site, a determination is made as to which of the redundant content providing sites will provide the set of content to the content display site. In general, such determination can be made in any appropriate manner.

For example, the redundant content providing site that will provide a set of content to a content display site can be chosen on the basis of topographical analysis of the network. For instance, it can be desirable that a content providing site be topographically proximate to the content display site(s) to which the content providing site is providing content. (In view of the foregoing, it can be desirable to locate redundant content providing sites at locations that are, within the region of the network to which it is anticipated content display site(s) are confined, topographically remote from each other, since that will likely increase the average topographical proximity between content providing sites and content display site(s) to which they provide content.) One method for determining the appropriate redundant content providing site, then, is to select the redundant content providing site that is most topographically proximate to the content display site. Those skilled in the art will understand how to implement a topographical analysis to determine the topographical proximity of content providing sites and content display sites. Illustratively, such analyses typically consider characteristics such as the number of network sites in a data communications path between two network sites, and use techniques such as simulated annealing or breadth first searching to identify the topographic proximity of two network sites. Those skilled in the art will appreciate that there are a variety of other types of topographical analysis that can be used with the invention.

Other considerations can also influence the selection of a redundant content providing site. For example, analysis of topographical proximity can be combined with evaluation of the number of content display sites that are, or may be, attempting to obtain content from each content providing site. Thus, for instance, a content providing site that is more topographically remote from a content display site than another content display site may still be selected as the content providing site to provide content if substantially fewer content display sites are attempting to obtain content from that content providing site than are attempting to obtain content from the other content providing site. Similarly, the bandwidth and latency characteristics of a connection to a content providing site can be integrated into a method for selecting a content providing site, e.g., a content providing site having a network connection with higher bandwidth and/or lower latency than another content providing site can be favored over that site. (Often, the magnitude of latency between two sites is inversely proportional to their topographical proximity, while the magnitude of bandwidth between two sites is often directly proportional to their topographical proximity.)

It is also possible to implement the invention so that a determination is made regarding the content providing site to provide a set of content before a determination is made as to the set of content to be provided, i.e., the selection of a particular set of content is subsidiary to the selection of the content providing site, so that the choice of a set of content to provide is limited to only the set or sets of content available from a selected content providing site. For example, the invention could be implemented so that the content providing site that best satisfies a predetermined characteristic (e.g., geographical proximity to the content display site) is chosen as the content providing site from which a set of content will be provided. This may be desirable, for example, if the nature of the content is such that geographical proximity is highly relevant to the appropriateness of the particular content provided (e.g., if the content is the current time of day).

As indicated above, the identification of the set of content and the proxy content providing site need not necessarily be performed at the primary content providing site, but can also be performed at any network site other than the primary content providing site. For example, appropriate software and computational device(s) may be present at a content display site to perform a method or methods (as discussed further above) for identifying the set of content and/or the proxy content providing site. (It may be desirable, for instance, that all information regarding characteristics of observer(s) at a content display site be stored at the content display site and not transferred over the network, in order to maintain the security of such information, thereby necessitating that identification of the appropriate set of content occur at the content display site.) In such an implementation, upon receipt of handoff instructions from a primary content providing site, the set of content and/or proxy content providing site are identified by the content display site, then the content display site transmits an appropriate instruction or instructions to the identified proxy content providing site to provide the identified set of content. Since the bandwidth required by such instructions is typically very small relative to the bandwidth required by the sets of content (for example, the handoff instructions will typically require several hundred bytes of data, while the content data for one video frame may require about 1 megabyte of data), the amount of time required to transmit such instructions between network sites is negligible. Further, the time required for any calculations necessary to identify a set of content or a content providing site also require a very small amount of time relative to the time required for transmission of content data. Consequently, the network site at which the identification of the set of content and the proxy content providing site are determined typically does not produce a significant effect on the performance of a system or method in accordance with the invention. However, depending upon the implementation of the invention, it may be necessary to ensure that appropriate information concerning parameters used in making the identification(s), e.g., information regarding the characteristic(s) of the anticipated observer(s) at one or more content display site(s), is transmitted to the network site at which such identification(s) are made.

Various embodiments of the invention have been described. The descriptions are intended to be illustrative, not limitative. Thus, it will be apparent to one skilled in the art that certain modifications may be made to the invention as described herein without departing from the scope of the claims set out below.

I claim:

1. A method for providing content to a content display site, comprising the steps of:

providing primary content from a primary content providing site to the content display site;

transmitting one or more handoff instructions from the primary content providing site, wherein the one or more handoff instructions specify the identity of the content display site and that secondary content is to be provided to the content display site; and providing secondary content from a proxy content providing site to the content display site in accordance with the handoff instructions, wherein:

the secondary content is different from the primary content; and the proxy content providing site is different from the primary content providing site.

2. A method as in claim 1, wherein the content is represented by data including video data.

3. A method as in claim 1, wherein the secondary content is provided at the same time as the primary content.

4. A method as in claim 1, wherein content is provided to a plurality of content display sites, the method further comprising the steps of:

providing primary content from the primary content providing site to each of the plurality of content display sites; and providing a plurality of sets of secondary content from a plurality of content providing sites to the plurality of content display sites, wherein the sets of secondary content are provided simultaneously to the content display sites.

5. A method as in claim 4, wherein at least two of the plurality of sets of secondary content are different from each other and are provided from different content providing sites.

6. A method as in claim 4, wherein the step of providing a plurality of sets of secondary content from a plurality of content providing sites further comprises the steps of:

providing one or more sets of secondary content from the primary content providing site; and providing one or more sets of secondary content from one or more proxy content providing sites.

7. A method as in claim 4, wherein the step of providing a plurality of sets of secondary content from a plurality of content providing sites further comprises the step of providing one or more sets of secondary content from each of a plurality of proxy content providing sites in accordance with the handoff instructions.

8. A method as in claim 7, wherein at least one of the plurality of proxy content providing sites provides secondary content that is different from the secondary content provided by at least one other of the plurality of proxy content providing sites.

9. A method as in claim 4, further comprising the step of determining which set of secondary content to provide to each of the content display sites.

10. A method as in claim 1, wherein the secondary content is available from a plurality of proxy content providing sites, the method further comprising the step of determining which of the plurality of proxy content providing sites will provide the secondary content to the content display site.

11. A method as in claim 10, wherein the step of determining which of the redundant content providing sites will provide the set of secondary content to a particular content display site further comprises performing a topographical analysis of the redundant content providing sites.

12. A method as in claim 1, wherein the handoff instructions include timing instructions for indicating the time by which a content display site must receive a set of secondary content.

13. A method for simultaneously providing a plurality of sets of content to a plurality of content display sites, comprising the steps of:

determining, for each content display site, a content providing site from which a set of content will be transmitted to the content display site, wherein a particular set of content is available from multiple redundant content providing sites;

transmitting one or more handoff instructions from a primary content providing site, the handoff instructions causing at least one proxy content providing site to provide a set of content to one or more content display sites in accordance with the set of handoff instructions, wherein the plurality of sets of content are provided from at least two different content providing sites; and determining which of the redundant content providing sites will provide the particular set of content to a particular content display site.

14. A method as in claim 13, wherein the content is represented by data including video data.

15. A method as in claim 13, wherein the at least two different content providing sites include the primary content providing site and at least one proxy content providing site.

16. A method as in claim 13, wherein none of the plurality of sets of content are provided from the primary content providing site.

17. A method as in claim 13, further comprising the step of determining which set of content to provide to each of the content display sites.

18. A method as in claim 13, wherein the handoff instructions include timing instructions for indicating the time by which a content display site must receive a set of secondary content.

19. A method as in claim 13, further comprising the steps of:

transmitting, from each of multiple content display sites to the primary content providing site, content identification instructions identifying a set of content to be provided to the content display site; and transmitting, from each of the multiple content display sites to the primary content providing site, timing instructions identifying when the requested set of content is to be provided to the content display site, wherein at least two sets of content must be provided to content display sites at different times.

20. A method as in claim 13, wherein at least two of the plurality sets of content are different from each other.

21. A system for providing content to a content display site, comprising:

means for providing primary content from a primary content providing site to the content display site;

means for transmitting one or more handoff instructions from the primary content providing site;

means for providing secondary content from one of a plurality of proxy content providing sites to the content display site in accordance with the handoff instructions, wherein:

the secondary content is different from the primary content; and the proxy content providing site is different from the primary content providing site; and means for determining which of the plurality of proxy content providing sites will provide the secondary content to the content display site.

22. A system as in claim 21, wherein the content is represented by data including video data.

23. A system for simultaneously providing a plurality of sets of content to a plurality of content display sites, comprising:

means for determining, for each content display site, a content providing site from which a set of content will be transmitted to the content display site, wherein a particular set of content is available from multiple redundant content providing sites;

means for transmitting one or more handoff instructions from a primary content providing site, the handoff instructions causing at least one proxy content providing site to provide a set of content to one or more content display sites in accordance with the set of handoff instructions, wherein the plurality of sets of content are provided from at least two different content providing sites; and means for determining which of the redundant content providing sites will provide the particular set of content to a particular content display site.

24. A system as in claim 23, further comprising:
means for transmitting, from each of multiple content display sites to the primary content providing site, content identification instructions identifying a set of content to be provided to the content display site; and
means for transmitting, from each of the multiple content display sites to the primary content providing site, timing instructions identifying when the requested set of content is to be provided to the content display site, wherein at least two sets of content must be provided to content display sites at different times.

25. A system as in claim 24, wherein the content is represented by data including video data.

26. A computer readable storage medium or media on which is stored one or more computer programs for providing content to a content display site, the one or more computer programs comprising:
instructions for providing primary content from a primary content providing site to the content display site;
instructions for transmitting one or more handoff instructions from the primary content providing site;
instructions for providing secondary content from a proxy content providing site to the content display site in accordance with the handoff instructions, wherein:
instructions for providing secondary content from one of a plurality of proxy content providing sites to the content display site in accordance with the handoff instructions, wherein:
the secondary content is different from the primary content; and
the proxy content providing site is different from the primary content providing site; and
instructions for determining which of the plurality of proxy content providing sites will provide the secondary content to the content display site.

27. A computer readable storage medium or media on which is stored one or more computer programs for simultaneously providing a plurality of sets of content to a plurality of content display sites, the one or more computer programs comprising:
instructions for determining, for each content display site, a content providing site from which a set of content will be transmitted to the content display site, wherein a particular set of content is available from multiple redundant content providing sites;
instructions for transmitting one or more handoff instructions from a primary content providing site, the handoff instructions causing at least one proxy content providing site to provide a set of content to one or more content display sites in accordance with the set of handoff instructions, wherein the plurality of sets of content are provided from at least two different content providing sites; and
instructions for determining which of the redundant content providing sites will provide the particular set of content to a particular content display site.

28. A method for providing content to a content display site, comprising the steps of:
providing primary content from a primary content providing site to the content display site;
transmitting one or more handoff instructions from the primary content providing site;
providing secondary content from one of a plurality of proxy content providing sites to the content display site in accordance with the handoff instructions, wherein:
the secondary content is different from the primary content;
the proxy content providing site is different from the primary content providing site;
the primary content is not transmitted to or from the proxy content providing site during the step of providing primary content; and
the secondary content is not transmitted to or from the primary content providing site during the step of providing secondary content; and
determining which of the plurality of proxy content providing sites will provide the secondary content to the content display site.

29. A method for providing content to a content display site, comprising the steps of:
providing primary content from a primary content providing site to the content display site;
transmitting one or more handoff instructions from the primary content providing site;
providing secondary content from one of a plurality of proxy content providing sites to the content display site in accordance with the handoff instructions, wherein:
the secondary content is different from the primary content;
the proxy content providing site is different from the primary content providing site; and
the primary content and the secondary content are not provided simultaneously from the primary content providing site or from the proxy content providing site; and
determining which of the plurality of proxy content providing sites provide the secondary content to the content display site.

30. A method for providing content to a content display site, comprising the steps of:
providing primary content from a primary content providing site to the content display site;
transmitting one or more handoff instructions from the primary content providing site;
providing secondary content from one of a plurality of proxy content providing sites to the content display site in accordance with the handoff instructions, wherein:
the secondary content is different from the primary content; and
the proxy content providing site is different from the primary content providing site; and
determining which of the plurality of proxy content providing sites will provide the secondary content to the content display site.

* * * * *